United States Patent [19]

Olez

[11] 4,206,895
[45] Jun. 10, 1980

[54] LOOP-TENSION JOINT

[76] Inventor: Nejat A. Olez, 6510 Ocean Crest #307, Rancho Palos Verdes, Calif. 90274

[21] Appl. No.: 891,912

[22] Filed: Mar. 30, 1978

[51] Int. Cl.² .............................................. B64C 3/26
[52] U.S. Cl. .................................. 244/123; 244/131; 244/132; 156/93; 428/113; 428/116
[58] Field of Search ................... 244/117 R, 119, 123, 244/131–133; 428/102, 113, 116–118; 156/93, 92

[56] References Cited

U.S. PATENT DOCUMENTS

| | | | |
|---|---|---|---|
| 1,322,348 | 11/1919 | Rosenhain et al. | 244/132 |
| 2,053,048 | 9/1936 | Robinson | 244/132 |
| 2,385,461 | 9/1945 | Pancoe | 244/132 |
| 3,481,803 | 12/1969 | Hewitt | 156/92 |
| 3,647,606 | 3/1972 | Notaro | 156/93 |
| 3,658,612 | 4/1972 | Corzine | 156/93 |
| 3,779,487 | 12/1973 | Ashton | 244/123 |
| 3,962,506 | 6/1976 | Dunahoo et al. | 244/123 |
| 3,966,013 | 6/1976 | Hatch et al. | 428/116 |
| 3,996,084 | 12/1976 | Holmes | 156/93 |
| 4,059,468 | 11/1977 | Bouillon | 156/93 |
| 4,113,910 | 9/1978 | Loyd | 428/113 |

*Primary Examiner*—Galen L. Barefoot

[57] ABSTRACT

A method and means for strengthening joints in bonded structural assemblies formed of two or more components fabricated of non-metallic composite materials, by using high strength strands or threads inserted through the joints by loop-stitching.

4 Claims, 5 Drawing Figures

LOOP-TENSION JOINT

CROSS-REFERENCE TO OTHER APPLICATIONS

A large part of the airframe section described above is devoted to composite skin panels stiffened on one side by composite stringers of the character described in copending patent application, Ser. No. 877,464, filed Feb. 13, 1978 for "Bonded Pin Joint" by Stuart H. Myhre, wherein the joint formed between a composite panel and stringer is reinforced by metal pins.

BACKGROUND OF THE INVENTION

Composite materials such as graphite-epoxy, boron-epoxy, etc., are replacing metal in the manufacture of airframes on a rapidly expanding scale. Such materials are, in many respects, superior to metal in corrosion-resistance, durability, strength, and produce substantial reductions in cost and weight.

As an example, in the manufacture of the forward fuselage section of the Northrop YF-17 aircraft, the use of graphite composite materials reduced weight by 40%, and costs by 30% compared to the all-metal design for the same assembly. Moreover, the all-metal fuselage section of the aircraft required 1300 parts and 20 subassemblies, whereas only 260 parts and 10 subassemblies were required in an identical section fabricated of composite materials.

FIELD OF THE INVENTION

My invention relates to the manufacture of articles and structures of composite materials including graphite-epoxy, boron-epoxy, and fiber-glass impregnated with plastic.

DESCRIPTION OF THE PRIOR ART

Examples of typical composite structures to which the loop-stitching of my present invention pertains are disclosed in U.S. Pat. No. 3,779,487 for a lightweight load carrying airfoil, and in U.S. Pat. No. 3,962,506 for a similar airfoil of multichambered construction. Also, U.S. Pat. No. 3,966,013 teaches the construction of an acoustical panel having a plurality of chambers which absorb and dissipate sound wave energy entering from outside the panel.

Another patent, U.S. Pat. No. 3,996,084 discloses a sewn hollow panel formed of resin-impregnated woven cloth which is suitable for composite structures.

While it is possible that more pertinent prior art exists, Applicant's search is believed to have been conducted with a conscientious effort to locate and evaluate the most relevant art available at the time, but the statement is not to be construed as a representation that no better art exists.

SUMMARY OF THE INVENTION

Two composite structures are bonded together, the bonded joint being strengthened by loop-stitching to deposit a continuous length of high strength filamentary material along the bond line and extending from the exterior of one of the structures into the interior of the other structure in the form of loops.

DESCRIPTION OF THE PREFERRED EMBODIMENT

Figure 1:
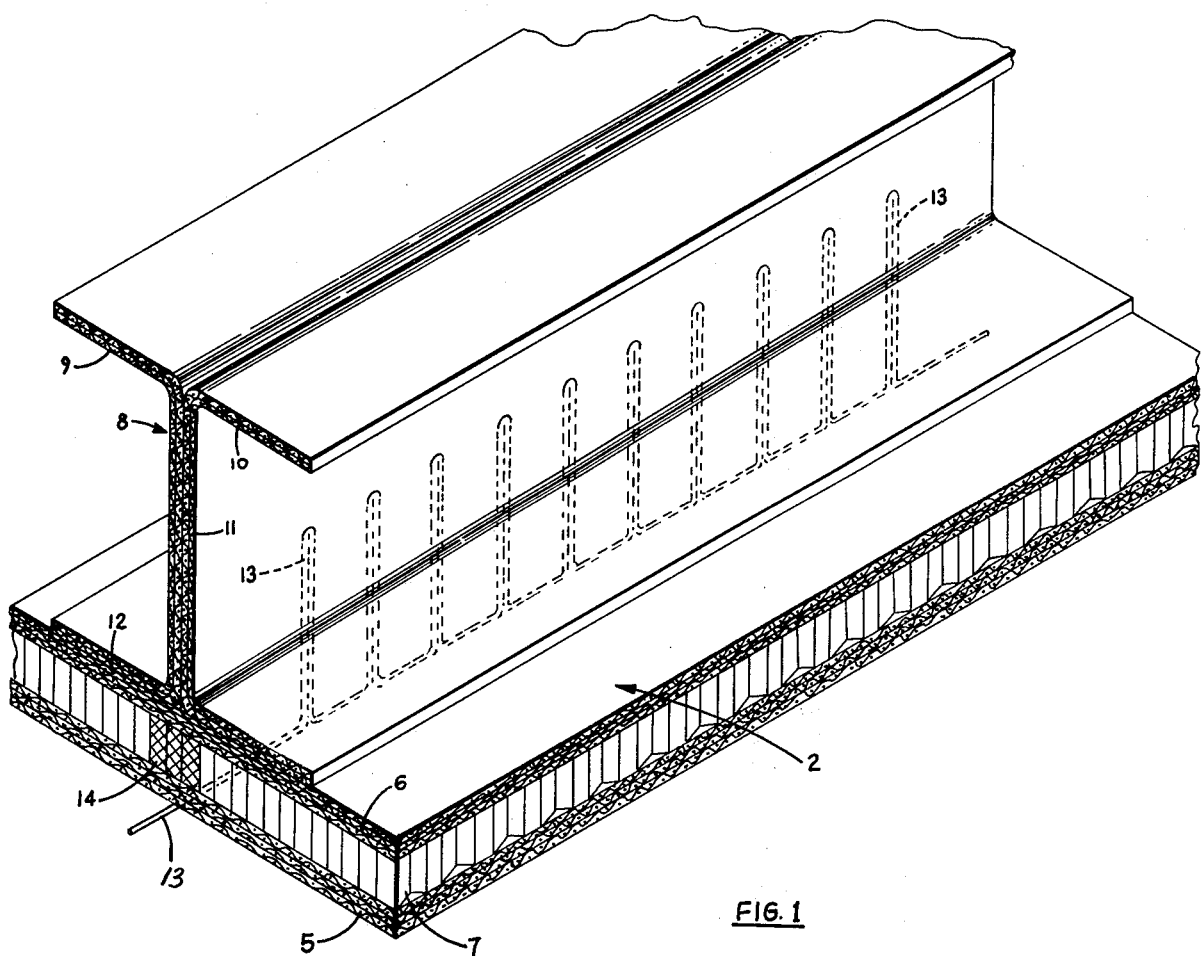
FIG. 1 is a fragmentary view in perspective showing a composite honeycomb sandwich panel reinforced on one side by a composite stringer utilizing the loop-stitching of my invention.

As shown in FIG. 1 a structural member of sandwich construction such as a fuselage or wing panel 2 for an aircraft airframe, comprises an outer skin 5 formed of two or more plies or laminae of resin-impregnated graphite cloth or fabric bonded and cured to form a unitary component, and an inner skin 6 which is identical in construction to the outer skin 5, enclosing honeycomb core 7, the assembly being bonded and subsequently cocured to form the high-strength, lightweight structural assembly.

A stringer 8, is formed by joining two U-shaped members 9 and 10 at their bights, defining between each end, a web 11. Each of the members 9 and 10 are also fabricated of two or more plies of resin-impregnated graphite or boron cloth, and is bonded on one of its ends to the surface of the inner skin 6, as shown, and is subsequently cocured therewith to provide a stiffener for the panel 2.

Since the combination of the panel 2 and stringer 8 possesses the least structural strength in the joint or bond line 12, which is subjected to stresses or loads in shear, it is the object of my invention to reinforce the joint prior to the curing step by inserting a length of high strength strand or thread 13 by loop-stitching to extend the thread perpendicularly through the panel 2 where it is deposited in the form of loops in the interface or bond line between the two U-shaped members 9 and 10 forming the web 11 of stringer 8. The reinforcing thread 13 is composed essentially of any suitable high strength material such as resin impregnated graphite, boron, or glass fibers, for example, which after insertion, may be cocured with the panel and stringer assembly.

As shown in FIG. 1, the cells of the honeycomb core 7 may be filled with any suitable potting compound 14 along the stitch line to firmly anchor the thread 13 therein, and also to prevent distortion of the panel 2.

Figure 2:
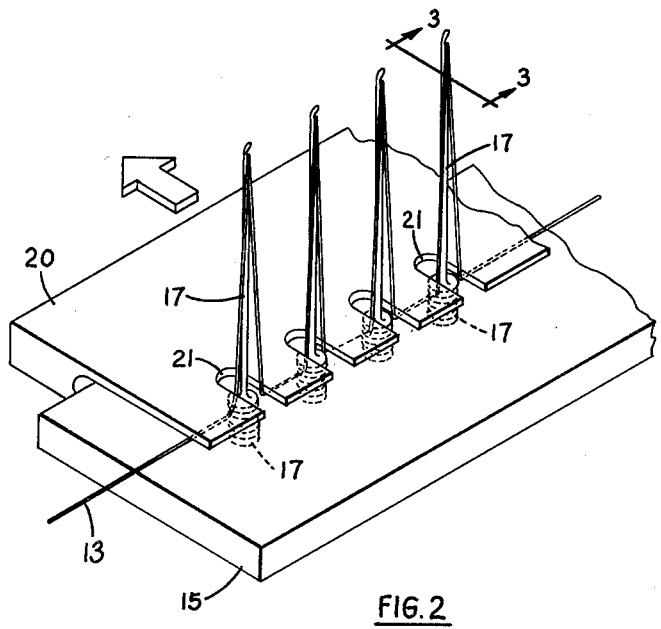
FIG. 2 is a fragmentary view in perspective showing one form of tool useful in practicing the loop-stitching of my invention.
Figure 3:
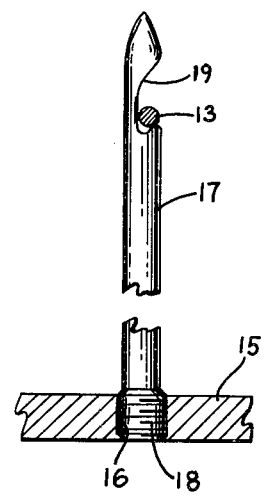
FIG. 3 is an enlarged fragmentary view of one of the needles of FIG. 2 useful in practicing my invention.

One form of tool for performing the loop-stitching is shown in FIG. 2 wherein a bolster plate 15 is provided with a number of threaded bores 16 arranged in a straight line. A like number of needles 17 having threaded members 18 at one thereof are perpendicularly mounted in the threaded bores 16. The opposite ends of the needles 17 are notched to define detents 19, as shown in FIG. 3, to hold the thread 13 in position during the stitching operation.

A spreader member 20, which is provided with a corresponding number of U-shaped openings 21 extends over the bolster plate 15 so that each opening 21 surrounds a needle 17 to maintain appropriate spacing of the thread.

The thread 13 is installed in the tool by alternately threading the thread under the spreader 20 and over the needle detents somewhat as shown in FIG. 2. The tool is then brought into contact, in any convenient manner, with the outer skin 5 of the panel 2, opposite the center line of the web 11 of the stringer, forcing the needles 17 carrying the thread 13 through the panel and into the stringer web 11 where the thread is deposited in the web 11 in a loop after the needles 17 are withdrawn, the loop being defined by the thread 13 doubled back upon itself along the extent of the stringer 8, substantially as shown.

It will be obvious to those skilled in the art that the joints of other composite assemblies, such as a single skin or sheet stiffened by a stringer, can be reinforced by loop-stitching in accordance with my present invention, or in the interior of wing or fuselage structures wherein fuel cells are mounted and must be secured at points therewithin, thereby dispensing with metal clips or fasteners.

Figure 4:
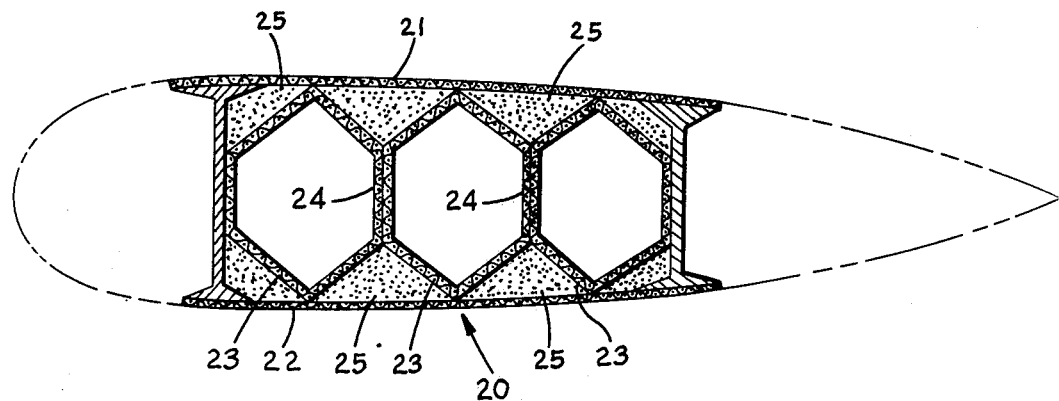
FIG. 4 is an elevational view in cross-section showing a center section for an aircraft wing.

For example, FIG. 4 shows a elevational view in cross-section of a center section 20 for an aircraft wing, in which the interior structure between the upper and lower wing panels or skins, 21 and 22, respectively is formed by hexagonally shaped tubular spars 23 fabricated of composite materials. As shown, the tubular spars 23 are positioned side by side and parallel with each other with adjacent facets or sides in abutment and joined together by bonding, forming a joint 24. The spar walls may be perforate (open lattice), if desired, to accommodate fuel storage.

The triangular interstices defined by the angles between the upper and lower facets of the tubular spars 23 are preferably filled with a suitable high-strength, lightweight composition 25 to additionally bond the upper and lower portions of the tubular spars 23 together. The structure is similar to that disclosed in U.S. Pat. No. 3,779,487 cited in the Description of the Prior Art (supra).

Figure 5:
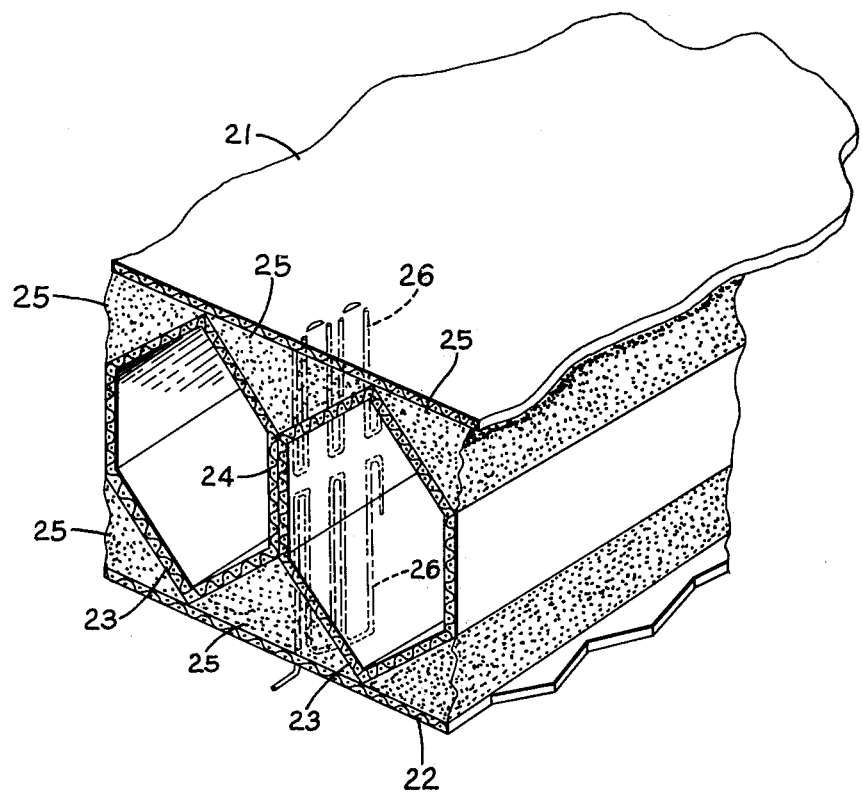
FIG. 5 is a perspective view of the center section shown in FIG. 4.

To further reinforce and strengthen the wing structure, as best shown in FIG. 5, loop stitching 26 is inserted along the bond lines defining the joints 24 between the tubular spars 23; the stitches extending from the outer skin surface, through the filler composition, and into the joints between the tubular spars in the form of loops similar to stitches shown in FIG. 1.

I deem all such use of the loop-stitching technique herein disclosed to fall within the scope and spirit of my invention as recited in the following claims.

I claim:

1. A center section for an airfoil comprising:
   (a) a plurality of filament-wound composite tubular members aligned in parallel with adjacent sides thereof abutting and bonded together,
   (b) interstices defined between said tubular members above and below the bond lines joining said members together on each side thereof, said interstices being filled with a high-strength, lightweight material,
   (c) skin panels enclosing said tubular members, and
   (d) a high-strength filamentary member extending from the exterior of said skin panels, through said filler material, and into said bond lines in the form of spaced-apart loops.

2. A reinforced structural joint for a composite structure comprising:
   (a) at least one skin panel;
   (b) two upstanding members bonded to said skin panel and having abutting surfaces bonded together forming a bond line where the surfaces abut: and
   (c) a unitary high-strength filamentary member extending through said skin panel into said bond line between said abutting surfaces of said upstanding members in the form of spaced-apart loops which double back upon themselves.

3. The reinforced structural joint of claim 2 wherein said two upstanding members are U-shaped and fabricated of two or more plies of resin-impregnated cloth.

4. A reinforced structural joint for a composite structure comprising:
   (a) at least one skin panel;
   (b) two upstanding U-shaped members having abutting surfaces bonded together at their bights forming a bond line where the surfaces abut and said two bonded U-shaped members forming a web member;
   (c) said web member bonded to said panel forming said structural joint; and
   (d) said structural joint reinforced by means of a high-strength filamentary member extending through said skin panel and into said bond line between said two upstanding members in the form of spaced-apart loops.

* * * * *